United States Patent [19]

Moore

[11] Patent Number: 4,913,924
[45] Date of Patent: Apr. 3, 1990

[54] PROCESS FOR MANUFACTURING GEL PIECES

[75] Inventor: Carl O. Moore, Rochester, Ill.

[73] Assignee: A. E. Staley Manufacturing Company, Decatur, Ill.

[21] Appl. No.: 154,155

[22] Filed: Feb. 9, 1988

[51] Int. Cl.⁴ .............................................. A23G 3/00
[52] U.S. Cl. ..................................... 426/578; 426/486
[58] Field of Search ......................... 426/489, 486, 578

[56] References Cited

U.S. PATENT DOCUMENTS

| | | | |
|---|---|---|---|
| 3,218,177 | 11/1965 | Robinson | 99/134 |
| 3,265,508 | 8/1966 | Wurzburg et al. | 99/134 |
| 3,265,509 | 8/1966 | Wurzburg et al. | 99/134 |
| 3,265,510 | 8/1966 | Wurzburg et al. | 99/134 |
| 3,446,628 | 5/1969 | Schoch et al. | 99/134 |
| 3,458,321 | 7/1969 | Reinhart et al. | 426/463 |
| 3,486,469 | 12/1969 | Recas | 107/54 |
| 3,950,543 | 4/1976 | Buffa et al. | 426/18 |
| 4,225,627 | 9/1980 | Moore | 426/548 |
| 4,465,702 | 8/1984 | Eastman | 426/578 |
| 4,567,055 | 1/1986 | Moore | 426/578 |
| 4,704,293 | 11/1987 | Moore et al. | 426/573 |
| 4,726,957 | 2/1988 | Lacourse et al. | 426/578 |

FOREIGN PATENT DOCUMENTS 972459 10/1964 United Kingdom .

Primary Examiner—Donald E. Czaja
Assistant Examiner—Mary S. Mims
Attorney, Agent, or Firm—Michael F. Campbell; J. Daniel Wood

[57] ABSTRACT

This invention provides a continuous process of preparing a formed gel piece by deaeration and hydration of a flowable mixture, cooling said flowable mixture to a formable viscosity in an extruder, and forming of the resulting formable mixture upon exit from the extruder. This process gives a gel confection product that is equivalent to that produced by the Mogul system but which avoids the extended batch drying times of the Mogul system. This invention also provides a new apparatus and method for extruding gel pieces as well as a new apparatus and method for injection molding gel pieces.

8 Claims, 4 Drawing Sheets

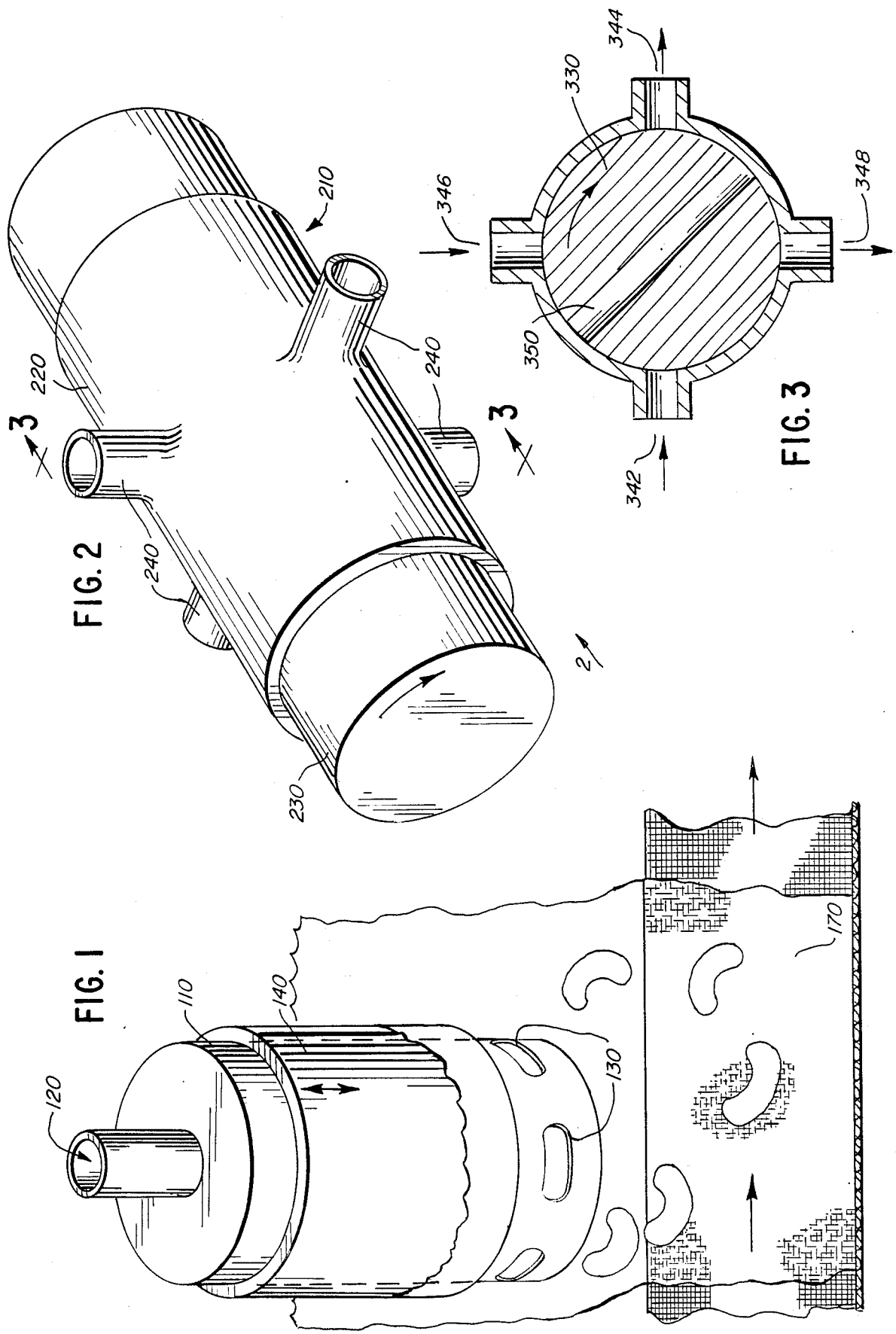

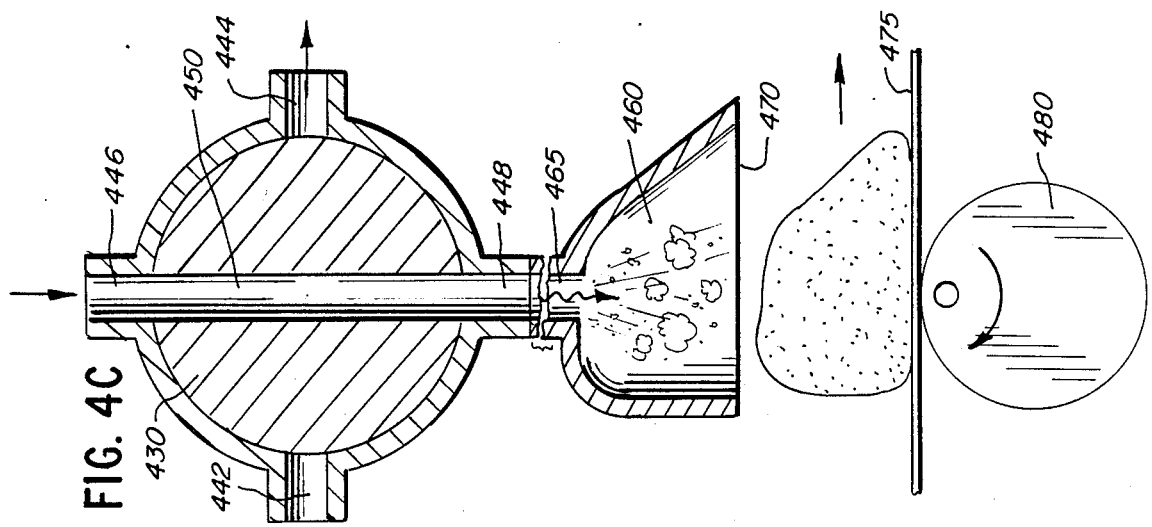
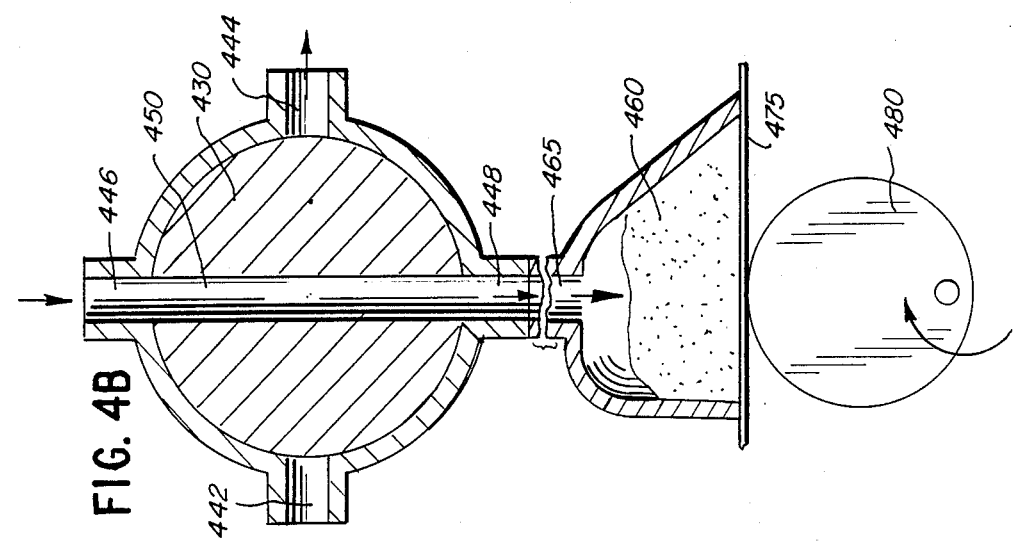
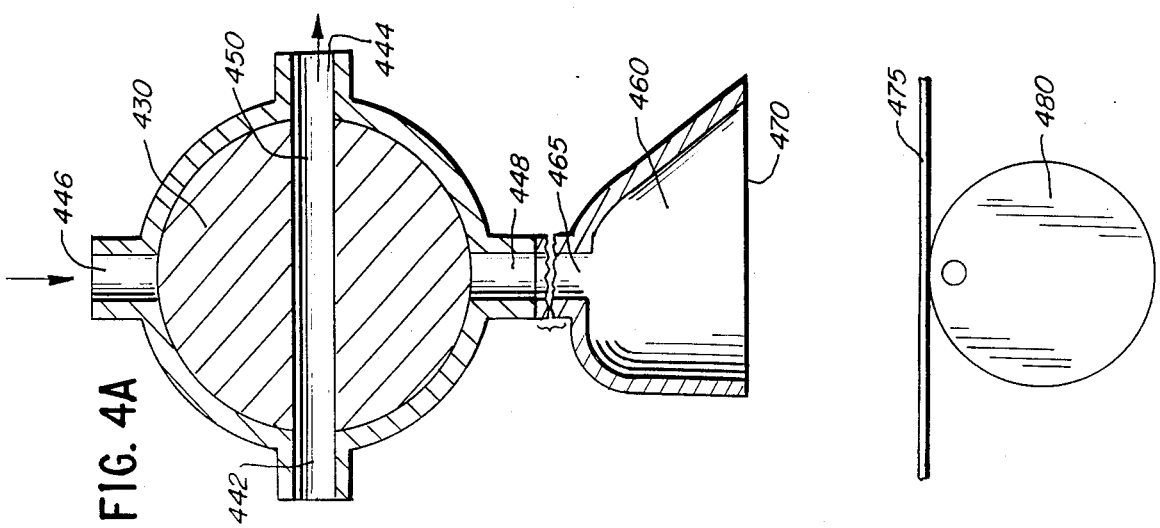

PROCESS FOR MANUFACTURING GEL PIECES

FIELD OF THE INVENTION

This invention relates to apparatus and methods useful in the manufacture of formed gel pieces derived from aqueous starch slurries, particularly formed gel confection pieces.

BACKGROUND OF THE INVENTION

Gel confections such as imitation fruit pieces, fruit bars, jelly bean centers, and sugared jellies have been prepared with sugar, water, and starch for many years. These confections have a firm, but soft, texture which contributes to their desirable mouthfeel. The gel confections are typically manufactured by a starch mold casting process known in the trade as the Mogul system. In this process, the ingredients are cooked at a temperature above the boiling point of the mixture and/or at a moisture level above that of the finished confection for a sufficient length of time to fully activate, or gelatinize, the starch. In a typical pressure cooking process for a commercial Mogul system, the ingredients are cooked at a moisture level of about 20 to 25 weight percent at a temperature of about 140° to 180° C. for less than about 1 minute. The starch is generally an acid-thinned (also known as thin-boiling) common corn starch or a high-amylose starch or a blend thereof. After cooking, the hot liquid mixture is deposited into a starch mold. The starch mold forms the confection and helps to reduce the moisture content. The deposited confections are then routinely dried for about 24 to 72 hours to reach the desired moisture content of about 14 to 20 weight percent.

There are many disadvantages of the Mogul system. High temperature cooking may cause carmelization which is detrimental to flavor and appearance. Cooking at high moisture levels requires subsequent drying. However, cooking at lower temperatures and/or with lower moisture levels does not fully gelatinize the starch. Ungelatinized starch does not significantly contribute to gel structure and, instead, functions only as filler. The primary disadvantage of the Mogul system is probably that it is extremely slow, due to the necessity of drying.

U.S. Pat. No. 3,265,508, 3,265,509, and 3,265,510 (Wurzburg et al.) disclose an alternative process of manufacturing starch-based confections. An aqueous mixture of sugar and a starch in non-dissolved form is subjected to the heat, pressure, shearing and mixing action of an extruder to effect dissolution the starch and sugar and then expelled from the extruder to form a solid, plastic, shape-retaiing confectionary mass.

U.S. Pat. No. 4,567,055 (Moore) discloses a process which comprises heating and extruding a mixture of sugar, water, and about 12 to 20 weight percent of a cold-water-swelling starch having an especially high gel strength. The starch is gelatinized as the mixture passes through the extruder, which subjects the mixture to heat and shear under high pressure. Optional ingredients include colors, flavors, fruit purees, juice concentrates, and acidulants. The relatively high level of the cold-water-swelling, high-gel-strength starch is employed to give the mixture a sufficiently-high viscosity for forming at the moisture level of the confection. This high level of starch also contributes to a final product texture which is firm, but more resilient than the traditional Mogul system gel confection.

To prepare a gel confection having a texture more similar to a Mogul system gel confection, U.S. Pat. No. 4,704,293 (Moore et al.) discloses a process of heating a mixture of sugar wwater and a first gelling agent to activate the first gelling agent, mixing the activated mixture with an instant starch gelling agent and forming the resulting mixture, e.g. by extrusion into ropes which areallowed to set and are then cut.

U.S. Pat. No. 4,225,627(Moore) generally describes processes for molding confectionery pieces with solid "starchless" molds and particularly describe the molding of gel confection pieces by deposition of a fluid mixture of confectionary ingredients comprised of a high amylose starch, into a solid, starchless mold, solidification of the confection inversion of the mold and demolding of the confection by the injection of steam into the inverted mold.

While the above extrusion methods and molding methods overcome various problems associated with the Mogul system, a need exists for efficient and convenient methods of preparing gel confections having superior optical clarity and/or the many shapes obtainable with the Mogul system.

SUMMARY OF THE INVENTION

In one aspect, this invention relates to a continuous process for producing a starch-based, formed gel composition comprising:
(a) first, preparing a flowable mixture comprised of starch and water;
(b) deaerating said flowable mixture;
(c) hydrating substantially all of the starch of said flowable mixture;
(d) introducing said flowable mixture into an extruder,
(e) cooling said flowable mixture to a formable viscosity in said extruder; and
(f) lastly, forming said flowable mixture at a formable viscosity upon exit from said extruder.

This process allos one to obtain a gel piece having excellent clarity in an efficient and convenient manner. The steps of deaerating and hydrating can be accomplished in any order prior to extrusion or contemporaneously with each other and/or extrusion, unless otherwise specifically noted herein. Thus, the sequential recitation of steps (b), (c) and (d) isn't meant, without more, to imply a particular step sequence. In preferred embodiments, however, particular sequences are employed, e.g. first (b), then (c), and then (d).

Accordingly, in preferred embodiments, this aspect relates to a continuous process for producing a starch-based, formed gel composition comprising:
(a) preparing a mixture comprised of a starch and water to form an aqueous slurry;
(b) deaerating said aqueous slurry;
(c) hydrating substantially all of the starch of said slurry to form a flowable mixture;
(d) introducing said flowable mixture into a non-aerating extruder;
(e) cooling said mixture to a formable viscosity in said extruder; and
(f) forming said flowable mixture at a formable viscosity upon exit from said extruder.

In particularly preferred embodiments, this aspect relates to a continuous process for producing a starch-based, formed gel composition comprising:

(a) mixing a granular starch and water to form an aqueous slurry;

(b) deaerating said slurry;

(c) heating said slurry under pressure to a temperature above its atmospheric boiling point to gelatinize said granular starch and form a flowable mixture;

(d) cooling said flowable mixture to a temperature below the boiling point of said mixture;

(e) introducing said flowable mixture into a non-aerating extruder;

(f) cooling said mixture to a formable viscosity in said extruder;

(g) forming said formable mixture upon exit from said extruder; and (h) cooling said formed mixture to produce a completely gelled composition.

In another aspect, this invention also relates to an extruder die apparatus comprising:

(a) a cylindrical chamber having an inlet and a plurality of elongated outlets, the elongations of said outlets extending circumferentially in the wall of said cylindrical chamber, (b) a reciprocaing sleeve associated with the exterior of said chamber and having a knife edge which traverse said outlets.

In preferred embodiments of this aspect, the cylindrical chamber is submersed in a water bath, at least to the extent of the outlets and a perforate belt is positioned below the outlets and extends out of the water bath. By "extending circumferentially", it is meant that the axis of elongation of said outlets is at an angle (preferably normal) to the axis of said cylindrical chamber.

In a related aspect, this invention also relates to a continuous method of forming gel pieces comprising:

(a) forcing a flowable mixture into a cylindrical chamber having an inlet and a plurality of elongated outlets, the elongations of said outlets extending circumferentially in the wall of said cylindrical chamber, (b) reciprocating a reciprocating sleeve associated with the exterior of said chamber and having a knife edge which transverses said outlets to alternately open said outlets to allow passage of said flowable mixture therethrough and close said outlets to cut said flowable mixture into pieces at said outlets.

The apparatus and method above allow the efficient and convenient production by extrusion of gel confection shapes other than a rope configuration and pieces derived therefrom. In preferred embodiments, the outlets are rounded rectangles, the elongations of which are normal to the axis of the cylindrical chamber. In these embodiments, the pieces closely resemble the classic rounded "kidney bean" shape of traditional "jelly beans" in all three dimensions which is an improvement over conventional Mogul process jelly bean centers that have a flat surface, and which rounded shape allows faster pan coating with sugar.

In another aspect, this invention relates to an injection molding apparatus comprising:

(a) a metering valve comprising (i) a rotatable cylindrical shafthaving a channel therethrough transverse to the axis of rotation of said shaft and (ii) a housing about said shaft having a first inlet port adapted to admit a flowable mixture into said channel, a first outlet port communicating through said channel with said first inlet to exhaust said channel, a second inlet port adapted to admit a propellent fluid into said channel and a second outlet port communicating through said channel with said second inlet port to convey said flowable mixture from said channel into a mold cavity;

(b) a mold assembly comprising (i) a mold cavity communicating with said second outlet and having a mouth at the bottom of said caity, and (ii) a continuous belt positioned below said mouth, and (iii) means to close said mouth with said belt; and (c) a synchronator assembly associated with said metering valve and said mold assembly to synchronize the rotation of said rotatable cylindrical shaft and said means for closing said mouth.

In a related aspect, this invention also relates to a continuous method of forming gel pieces comprising:

(a) feeding a flowable mixture and a propellant fluid into a metering valve comprising (i) a rotatable cylindrical shaft having a channel therethrough transverse to the rotation of said shaft and (ii) a housing about said shaft having a first inlet port adapted to admit a flowable mixture into said channel, a first outlet port communicating through said channel with said first inlet to exhaust said channel, a second inlet port adapted to admit a propellant fluid into said channel and a second outlet port communicating through said channel with said second inlet port to convey said flowable mixture from said channel into a mold cavity;

(b) rotating said shaft to alternately feed flowable mixture and propellent fluid through said channel into a mold assembly comprising (i) a mold cavity communicaing with said second outlet and having a mouth at the bottom of said cavity, and (ii) a continuous belt positioned below said mouth, and (iii) means to close said mouth with said belt; and (c) activating said means to close said mouth in synchronization with the rotation of said shaft to successively form a plurality of formed gel pieces and moving said continuous belt to accept said successively formed gel pieces.

The above apparatus and method allow for a substantially automated, continuous production of formed gel pieces in a variety of shapes depending upon the chosen mold cavity configuration. In a preferred embodiment, the mold cavity is stationary and the belt is associated with a rotatable cam to raise the belt to the mouth in synchronization with the rotation of the shaft of the valve assembly.

BRIEF DESCRIPTION OF THE DRAWINGS

FIG. 1 is a perspective view of an embodiment of an extruder die apparatus of this invention.

FIG. 2 is a perspective view of a metering valve of an embodiment of an injection molding apparatus of this invention.

FIG. 3 is a cutaway view of the metering valve of FIG. 2 taken along line AA'.

FIGS. 4A-4C are cutaway views of an embodiment of an injection molding apparatus of this invention showing such apparatus in sequential positions during operation thereof.

DETAILED DESCRIPTION OF THE INVENTION

Figure 5:
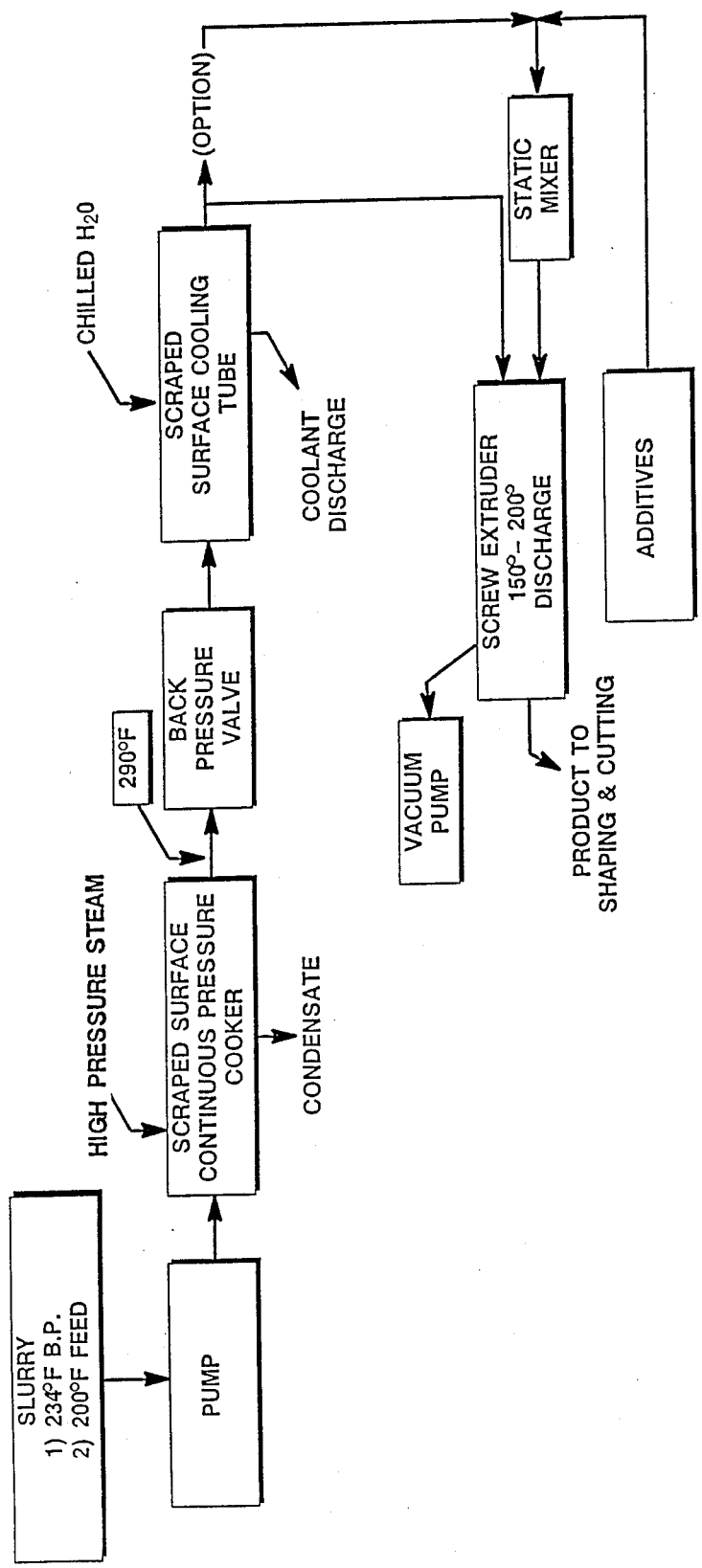
FIG. 5 is a flow diagram of an embodiment of this invention outlining a continuous method of producing starch-based, formed gel composition.

The first step in preparing a gel piece is the mixing of a starch and water to form an aqueous slurry. Any type of starch capable of thickening to a gel is acceptable. Acid-thinned common corn starches and high-amylose starches are preferred because of their gel-strength and reduced hot viscosity, but native starch (pure food product grade) is acceptable. An especially preferred acid-thinned starch is MIRA-SET ® 285 corn starch, a commercial product of the A. E. Staley Manufacturing Company, which exhibits gel strengths markedly superior to a conventional acid-thinned starch of equal fluidity. Modified non-gelling starches can also be blended with the gelling starch to provide thickening during processing.

Also useful as gelling starches are those capable of hydrating in room temperature water, known in the trade as an "instant" starch. There are two basic types of instant starch: (1) precooked (also known as pregelatinized) starch; and (2) cold-water-swelling granular starch. The latter is preferred and it is more preferred that the second gelling agent is a granular and nonbirefrigent starch having a fat content of less than 0.25 weight percent, a cold-water solubility of greater than 50 weight percent, and a gel strength of greater than 90 grams. The cold water solubility is measured by the test described in Example 1 and the gel strength is measured by the test described in Example 2. Eastman, U.S. Pat. No. 4,465,702, issued Aug. 14, 1984, which is incorporated by reference, describes a process for preparing such a starch. Suitable starches include unmodified (i.e., no chemical modification) and modified (e.g., substituted, cross-linked, thin-boiling, and oxidized) corn, tapioca, and potato starches.

In addition to the starch, the mixture can also comprise secondary gelling agents such as pectin, agar, alginate, cellulose gums, gelatin, seed guns, flour and the like. However, the use of starch alone is generally preferred for the desirable properties it imparts to the resultant gel.

The water mixed with the starch fluidizes the mixture, provides moisture to the gel and is necessary for the hydration of the starch. The water may be added separately or as part of another ingredient, e.g. as in a corn syrup and/or a fruit juice. The amount of water used should be substantially equal to that desired in the final gel. If volatilization of water from the slurry prior to forming is anticipated (e.g., as a result of the deaerating of the slurry), such volatilization should be taken into account in determining the amount of water used in the slurry to retain the amount desired in the gel.

To prepare a gel confection, the slurry will also contain a sugar. The term "sugar"]is used to described a carbohydrate having one, two, or more saccharose groups. In other words, the term is not used as a synonym for sucrose. Sugar in a confection is used primarily for sweetness, but also plays an important role in such physical properties of the confection as crystallinity, gel strength, humectancy, and water activity. Sugars suitable for use include sucrose, glucose (also known as dextrose), fructose, maltose, invert sugar, sorbitol and lycasin (a hydrogenated, high maltose corn syrup). The sugar may be added in crystalline or other solid form or it may be added in the form of an aqueous solution such as a corn syrup containing dextrose, maltose, and higher saccharides or a high fructose corn syrup containing fructose, dextrose and higher saccharides. The less sweet and less expensive sugars such as corn syrup solids and low calorie bulking sugars such as polydextrose are useful in conjunction with non-sugar sweeteners such as aspartame and saccharin. A preferred sugar is a blend of sucrose and corn syrup because of cost and the desired physical properties imparted to the confection.

The components of the slurry are mixed together to form a fluid, flowable mixture. The mixture should be maintained as a fluid mixture to facilitate deaeration of the slurry. While a "cook-up" starch will not normally hydrate sufficient to gelatinize upon merely mixing with water, an instant starch may do so. Accordingly, it may be desirable to first mix an instant starch with water under conditions that will not allow the instant starch to significantly hydrate (e.g. use only a portion of the water, or first dissolve the sugar in the water or use a corn syrup) to reduce the likelihood that an instant starch will hydrate sufficiently to impair the deaeration of the slurry.

The second step of the method is the deaeration of the mixture. The addition of dry starch and/or sugar to water (or vice versa) to form the mixture will entrap air in the mixture. Also, the water used to form the mixture may have gases already dissolved therein. Accordingly, the mixture is deaerated, i.e. at least a portion of the entrapped air and/or dissolved gases are removed prior to forming the gel composition to a gel piece.

The deaeration of the mixture can be accomplished in a variety of ways. For example, the mixture can be heated to a full boil at atmospheric pressure. Alternatively, the mixture can be subjected to reduced pressure with agitation of the mixture. Likewise, a combination of heat and reduced pressure can be employed.

The deaeration of the mixture can be postponed to the extrusion step, i.e. an extruder having a vacuum vent or other means of venting gases from the interior of the extruder barrel. However, it is preferred to deaerate the mixture prior to extrusion because the extruder is preferably used to cool the mixture to a formable viscosity and, thus, this cooling may impair the escape of gases from the mixture.

The transport of the deaerated flowable mixture to the extruder barrel should be accomplished in a manner that minimizes any interface between the flowable mixture and the atmosphere (i.e. air or other gases at atmospheric pressure or greater). Techniques which minimize such interface include transport in enclosed conduits, avoidance of pouring the flowable mixture to remove it from a deaeration and/or hydration vessel (e.g. removal by gravity flow from a port near the bottom of the vessel), avoidance of agitation of the flowable mixture (e.g. transport by gravity flow as opposed to forced flow by pumping), and the like.

In preferred embodiments, the starch of the mixture is gelatinized after deaeration and prior to introduction of the mixture into an extruder. Preferred mixtures contain "cook-up" starches which are gelatinized during a cooking period after deaeration and prior to extrusion. Cooking under atmospheric pressure in a heated vessel will simultaneously fully hydrate the starch and remove excess moisture, if any. Pressure cooking can also be used, particularly when it is desired to retain substantially all of the water in the mixture. In any event, the method of cooking should not allow significant amounts of air or other gases to be reintroduced into a deaerated mixture.

Additives, such as colorants, flavors (e.g. natural and/or imitation fruit flavors and/or juices), and the like are commonly added after cooking and before extrusion, although in the closed continuous system shown in FIG. 5, large quantities of fruit juice can be added to the slurry before cooking and yield a satisfactory result. Because these are usually minor amounts of liquids, they can be easily dispersed in the mixture without introducing large amounts of air or other gases.

The mixture is fed to an extruder for forming. As noted above, the starch of the mixture is preferably gelatinized prior to introduction into the extruder, but gelatinization can be accomplished in the extruder if desired. In fact, deaeration can also be accomplished in the extruder by appropriate venting and/or vacuum application.

The extruder should be non-aerating, i.e. an extruder design should be chosen which minimizes the mixing of the mixture with air. Suitable extruders include ram extruders, screw extruders having minimal mixing capabilities (e.g. single screw extruders having minimal clearance between screw and barrel and uniform flow patterns), vented screw extruders, and roller press extruders (e.g. a rotary bar roller press type available from Bepex-Hutt Company.). Likewise, the extruder chosen should be operated to minimize mixing with air (e.g. by minimizing interface between the mixture and the atmosphere) if no venting or vacuum is applied. If the extruder is vented, it can be a single stage or two-stage extruder with a vent between the stages. The vent can be fitted with a vacuum line or a portion of the barrel can be heated to aid in drying air out the vent, if necessary.

The mixture is cooled prior to exit from the extruder to a formable viscosity. Accordingly, the extruder is preferably fitted with a means of cooling the extruder barrel (e.g. a cooling water jacket) to cool the mixture in the extruder. The extruder barrel can also be heated near the inlet to gelatinize the mixture in the extruder, if desired. The flowable mixture can also be deaerated and/or hydrated in a first vented and/or heated extruder and then fed by enclosed conduit to a second extruder for cooling and forming.

The mixture is formed upon exit from the extruder. By "upon exit", it is meant that the mixture is formed during exit from the extruder (e.g. by passage through a die) or shortly after exit from the extruder (e.g. by feeding the extrudate to a mold cavity). A conventional forming procedure is to extrude the mixture through a circular die to form ropes which are collected by a continuous belt and passed through a refrigerated tunnel prior to cutting to the desired length with a reciprocating knife or a "guillotine" type chopping blade. Alternatively, the extrudate can be cut at the die face by a reciprocating or rotating blade or wire. A chilled water wash or spray on the blade or wire is an effective lubricant which prevents sticking and fouling of the blade or wire.

This invention also relates to an apparatus and method for extruding flowable material through a particular die to prepared formed gel pieces. A preferred embodiment of the apparatus and its mode of operation will be described in detail with reference to FIG. 1. FIG. 1 shows cylindrical chamber 110 having inlet 120 and elongated outlets 130 extending circumferentially in said chamber. Reciprocating sleeve 140 encircles cylindrical chamber 110 and reciprocates down from the position shown so that knife edge 150 passes over elongated outlets 130, and back up to re-expose said elongated outlets. Cylindrical chamber 110 is immersed in a water bath (details not shown) to the extent shown by water level 160. Wire belt 170 is positioned below said outlets in said water bath and extends out of said water bath (not shown). When a gelatinized starch mixture is fed through inlet 120 and allowed to pass through elongated outlets 130, knife edge 150 of reciprocating sleeve 140 closes said outlets and cuts the extrude into discrete gel pieces below water level 160. The pieces fall onto wire belt 170 which extends out of the wire bath and conveys the pieces therefrom (not shown). The pieces can be partially dried with a warm air draft and coated by tumbling in dry sugar.

The immersion of the outlets and knife edge in a water bath has a variety of advantages. The water lubricates the reciprocating sleeve and the extrudate and thus prevents sticking of the pieces to the sleeve and to each other. The temperature of the water bath can be controlled to efficiently cool the gel pieces and accelerate formation of a firm gel structure.

This invention also relates to an injection molding apparatus for forming a flowable material into formed gel pieces. A preferred embodiment of the apparatus and its mode of operation will be described in more detail with reference to FIGS. 2–4. In FIG. 2, metering valve 210 is shown having housing 220 about rotatable cylindrical shaft 230. Housing 220 has inlet and outlet ports 240 which communicate by way of a channel (not shown) which extends through said shaft transverse to the axis of rotation of said shaft. FIG. 3 shows a cross-section of metering valve 210 taken through line AA' across shaft 230. Upon rotation of shaft 330, feed port 342 communicates through channel 350 with exhaust port 344 and, alternately, inlet port 346 communicates with outlet port 348. Feed port 342 is preferably fed by an extruder (not shown) and inlet port 346 is fed by a source of propellant fluid (e.g. steam).

Channel 350 extends through shaft 330 transverse to the direction of rotation of said shaft. In particular, channel 350 extends through the diameter of said shaft and is substantially normal to the direction of rotation of said shaft. Rotation of said shaft will bring channel 350 into alignment with inlet port 346 and outlet port 348 and alternately, feed inlet 342 and exhaust port 344. In use, channel 350 is first aligned with feed port 342 and exhaust port 344 to allow flowable material to flow into said channel. Rotatable cylindrical shaft 330 is then rotated to aligned said channel with inlet port 346 and outlet port 348 which allows a propellant fluid to pass through said inlet port and force the flowable material through said outlet port. Outlet port 348 is connected to a mold assembly for molding the flowable material.

A preferred mold assembly is shown in FIGS. 4A–4C which shows a cutaway of the same mold assembly in three different phases of mold operation. In FIGS. 4A–4C, mold cavity 460 communicates with outlet port 448 by way of conduit 465. Mold cavity 460 has mouth 470 at the bottom thereof. Belt 475 is positioned below said mouth and rests on can 480. Belt 475 is continuous and is preferably associated with a drive means (not shown) that is preferably synchronized with the rotations of shaft 430 and cam 480 to interrupt the drive of belt 475 during filling of mold cavity 460.

In FIG. 4A, the mold assembly is in a rest position with belt 475 not closing mouth 470 and the metering valve is in a channel fill position wherein channel 450 aligned with feed inlet 442 and exhaust port 444. FIG.

4B shows the metering valve in a fill position with channel 450 aligned with inlet port 346 and outlet port 348 to propel flowable material through outlet 448. Also, the mold assembly is in a mold fill position wherein cam 480 has been rotated from the position shown in FIG. 4A to raise belt 475 to mouth 470. Mouth 470 fits flush against belt 475 to close said mouth. Shaft 430 has been has rotated one quarter turn from the position shown in FIG. 4A to align channel 450 with inlet port 446 and outlet port 448. Mold cavity 460 is then filled with flowable material through conduit 465 and cam 480 rotates to lower belt 475 from mouth 470 to the position shown in FIG. 4C. Gel piece 485 formed in the mold caity may adhere to the belt or may fall from mold cavity 460 as belt 475 falls away, but a propellant gas (preferably steam) is preferably supplied through inlet port 446 to outlet port 448 and thence to conduit 465 to eject said gel piece.

The rotation of rotatable cylindrical shaft 430 and cam 480 and synchronized to obtain the relative positions of FIGS. 4A & B. By "synchronized", it is meant that their respective rotations and any interruptions thereof are coordinated, but not necessarily matched, to obtain a desired sequence. Rotatable cylindrical shaft 430 and cam 480 are preferably synchronized through an interconnecting system of gears.

In an alternative embodiment (not shown), cam 480 is omitted and a movable mold cavity, optionally associated with a movable metering valve, is lowered to belt 475 and raisedfrom belt 475 in synchronization with the rotation of the shaft of the metering valve. In this alternative embodiment, flexible conduit is provided between a stationary metering valve and a movable mold cavity or between a stationary source of feed of flowable mixture and a movable metering valve and mold cavity to accommodate the relative movement therebetween.

EXAMPLE

The following example illustrates two alternative methods of forming gel pieces in accordance with the present invention.

EXAMPLES 1 AND 2

Mix the following ingredients in a steam jacketed kettle and thoroughly disperse into a uniform blend.

| INGREDIENTS | PARTS BY WEIGHT | WT % DSB |
|---|---|---|
| Corn Syrup (65 D.E. at 44 Be, Sweetose TM 4400 from A. E. Staley Mfg. Co.) | 1998.3 | 50 |
| Sugar (granulated sucrose) | 1175.5 | 35 |
| Thin Boiling Starch (Miraset TM 285 from A. E. Staley Mfg. Co.) | 557.5 | 15 |
| Water | 268.7 | — |
| Total | 4000 (at 84% d.s.) | 100% |

Figure 6:
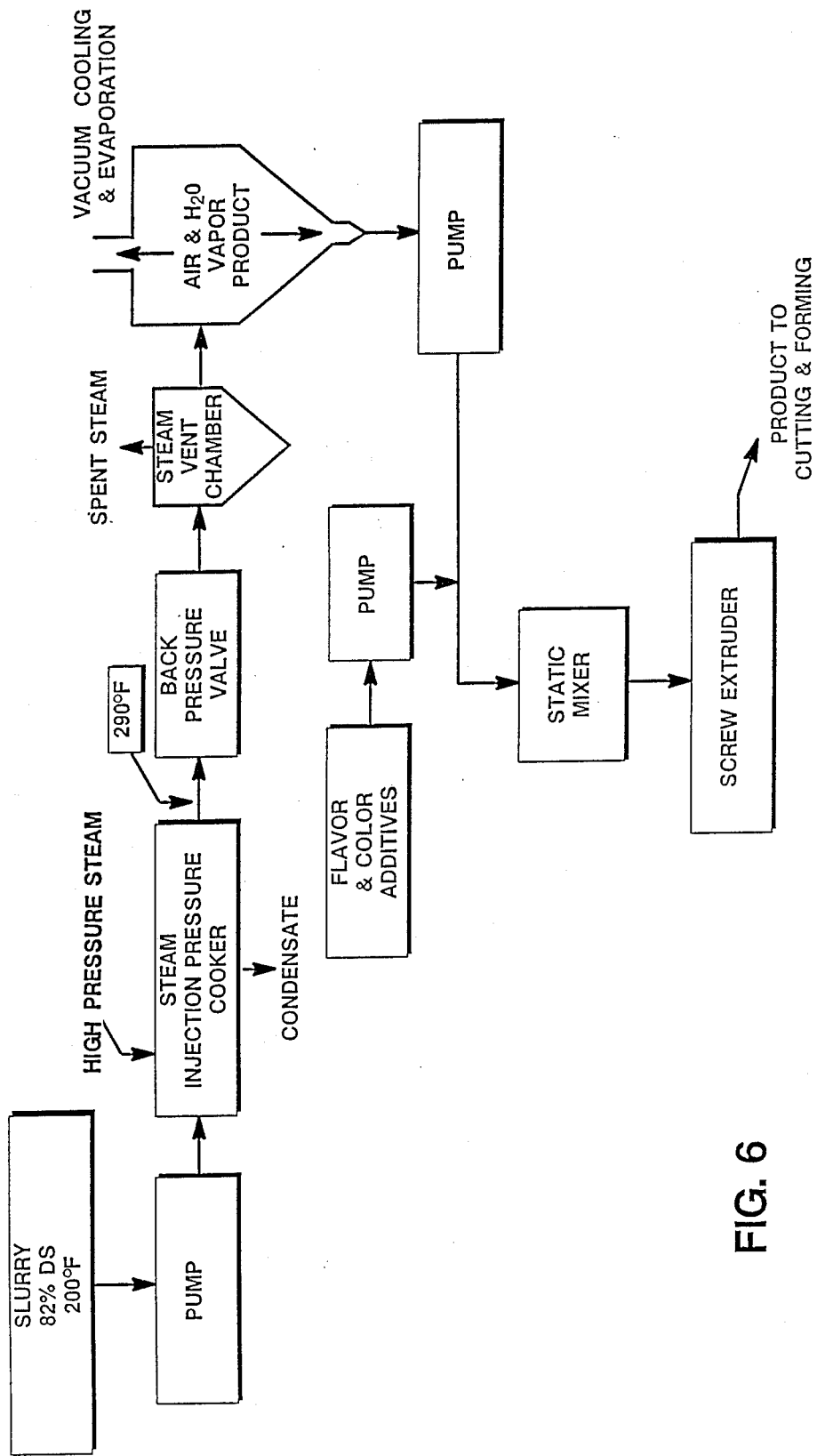
FIG. 6 is a flow diagram of an embodiment of this invention outlining an alternative continuous method of producing starch-based, formed gel composition.

Heat the mixture to a rolling boil to expel entrapped and dissolved air. Discontinue further agitation or recirculation and allow any remaining air to rise to the surface and dissipate or remain as a "head foam". Draw slurry supply for process feed pump from the bottom of the kettle for one of two alternative processes shown in schematic in FIGS. 5 and 6. The screw extruders can be replaced by roll press extruders. The 290° cooking temperature of the slurry is intended for the thin boiling starch noted above, while a higher temperature, e.g. 340° F., may be necessary for a high amylose starch.

What is claimed is:

1. A continuous process for producing a starch-based, formed gel composition comprising:
   (a) first, preparing a flowable mixture comprised of a starch and water;
   (b) deaerating said flowable mixture;
   (c) hydrating substantially all of the starch of said flowable mixture;
   (d) introducing said flowable mixture into a non-aerating extruder;
   (e) cooling said flowable mixture to a formable viscosity in said extruder, and
   (f) lastly, forming said mixture at a formable viscosity upon exit from said extruder.

2. A process of claim 1 wherein said deaerating and said hydrating are accomplished in the barrel of a vented extruder.

3. A process of claim 2 wherein said vented extruder is the same extruder used to cool said flowable mixture to a formable viscosity.

4. A process of claim 1 wherein said deaerating and said hydrating are accomplished before said introducing.

5. A process of claim 4 wherein said introducing minimizes any interface between said flowable mixture and the atmosphere.

6. A process of claim 4 further comprising transporting said flowable mixture from said deaerating to said extruder by an enclosed conduit.

7. A continuous process for producing a starch-based, formed gel composition comprising:
   (a) preparing a mixture comprised of a starch and water to form an aqueous slurry;
   (b) deaerating said aqueous slurry;
   (c) hydrating substantially all of the starch of said slurry to form a flowable mixture;
   (d) introducing said flowable mixture into a non-aerating extruder;
   (e) cooling said flowable mixture to a formable viscosity in said extruder; and
   (f) forming said mixture at a formable viscosity upon exit from said extruder.

8. A continuous process for producing a starch-based, formed gel composition comprising:
   (a) mixing a granular starch and water to form an aqueous slurry;
   (b) deaerating said slurry;
   (c) heating said slurry under pressure to a temperature above its atmospheric boiling point to gelatinize said granular starch and form a flowable mixture;
   (d) cooling said flowable mixture to a temperature below the boiling point of said flowable mixture;
   (e) introducing said flowable mixture into a non-aerating extruder;
   (f) cooling said flowable mixture to a formable viscosity in said extruder;
   (g) forming said mixture at a formable viscosity upon exit from said extruder; and
   (h) cooling said mixture after said forming to produce a completely gelled composition.

* * * * *